(12) United States Patent
Zancho et al.

(10) Patent No.: US 6,208,625 B1
(45) Date of Patent: Mar. 27, 2001

(54) METHOD AND APPARATUS FOR INCREASING CALL-HANDLING CAPACITY USING A MULTI-TIER SATELLITE NETWORK

(75) Inventors: William Frank Zancho, Hawthorn Woods, IL (US); Michael William Krutz, Chandler; Gregory Barton Vatt, Mesa, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/871,911

(22) Filed: Jun. 12, 1997

(51) Int. Cl.[7] .................................................. H04B 7/185
(52) U.S. Cl. .............................................. 370/316; 455/427
(58) Field of Search .................................. 370/316, 320, 370/321, 324; 342/352, 353, 356; 359/172; 455/12.1, 13.4, 98, 427, 428, 435

(56) References Cited

U.S. PATENT DOCUMENTS

| | | | |
|---|---|---|---|
| 5,218,467 | * 6/1993 | Ross et al. | 359/172 |
| 5,408,237 | * 4/1995 | Patterson et al. | 342/354 |
| 5,467,345 | * 11/1995 | Cutler, Jr. et al. | 370/351 |
| 5,490,087 | * 2/1996 | Redden et al. | 455/427 |
| 5,887,257 | * 3/1999 | Olds | 455/427 |
| 5,906,337 | * 5/1999 | Williams et al. | 455/13.1 |

FOREIGN PATENT DOCUMENTS 0767547    9/1996   (EP) ............................. H04B/7/195

OTHER PUBLICATIONS

Article entitled "Personal Communications Via Low Earth Orbit Satellite Communication Networks", Richard A. Raines and Nathaniel J. Davis, IV (Nov. 1995).

Book entitled "Mobile Communication Satellites" T. Logdson (1995), pp. 129–147, XP002078784.

\* cited by examiner

*Primary Examiner*—Chau Nguyen
*Assistant Examiner*—Chiho Andrew Lee
(74) *Attorney, Agent, or Firm*—James E. Klekotka; Frank J. Bogacz

(57) ABSTRACT

A system for increasing call-handling capacity employs a multi-tier satellite network which includes one or more geosynchronous (GEO) satellites (12) and non-geosynchronous satellites (14). The GEO satellites (12) transfer non delay-sensitive data through the system, while the non-geosynchronous satellites (14) predominantly transfer delay-sensitive data through the system. In a preferred embodiment, a non-geosynchronous satellite (14) receives (102) a data packet, determines (112) whether or not the data packet is delay-sensitive, routes (114) a delay-sensitive data packet through the LEO network, and routes (116) a non delay-sensitive data packet to a GEO satellite (12).

13 Claims, 4 Drawing Sheets

METHOD AND APPARATUS FOR INCREASING CALL-HANDLING CAPACITY USING A MULTI-TIER SATELLITE NETWORK

FIELD OF THE INVENTION

This invention relates generally to satellite communications and, more particularly, to routing delay-sensitive and non delay-sensitive data through satellites.

BACKGROUND OF THE INVENTION

Prior-art satellite communications networks use either low-earth orbit (LEO), medium-earth orbit (MEO), or geosynchronous orbit (GEO) satellites to transfer data from a data source to a destination. Such data can include, for example, delay-sensitive data such as voice data communicated during a phone conversation. Voice data is particularly delay-sensitive because long, delay-imposed pauses during oral communications can make communication quality poor. Data requiring transfer through a network also can include non delay-sensitive data such as, for example, system overhead data including: call setup information; TT&C data (telemetry, tracking, and control); routing information; billing information; and short messages (e.g., pages).

LEO satellites are better suited than GEO satellites for communication of delay-sensitive data. Because GEO satellites are located at a substantially greater distance than LEO satellites from the earth-based equipment with which they communicate, significantly longer signal propagation delays are inherent in communications between GEO satellites and earth-based equipment. Because of the delay issues associated with GEO satellites, many prior-art satellite communication networks designed for voice communications use LEO satellites to communicate delay-sensitive data traffic.

The call-handling capacity of a LEO satellite network is inversely proportional to the amount of system overhead data which must be routed through the network. Because system overhead data is routed through the LEO satellites in prior-art systems, the satellites cannot provide as many traffic channels as they would be able to in the absence of such system overhead data.

Because high-capacity systems are highly desirable, what is needed is a method and apparatus which increases the traffic carrying capacity of a satellite network by reducing the effect of transferring system overhead data throughout a system.

DETAILED DESCRIPTION OF THE DRAWINGS

The method and apparatus of the present invention increases the traffic carrying capacity of a satellite network while providing the ability to communicate system overhead data throughout a system. This is achieved using a multi-tier satellite system, where a "satellite tier" includes a group of one or more satellites. In a preferred embodiment, two satellite tiers are used, a first tier including non-GEO satellites and a second tier including GEO satellites. The non-GEO satellites receive and route delay-sensitive data through the non-GEO network. In addition, the non-GEO satellites receive non delay-sensitive data which the non-GEO satellites route to a GEO satellite. Thus, some or all of the non delay-sensitive data is not routed through the non-GEO network, which effectively increases the system capacity by enabling more of the non-GEO communication resources to be used for communication of delay-sensitive data (e.g., voice data).

The method and apparatus of the present invention could be used, for example, as a backbone network for terrestrial networks (e.g., terrestrial cellular and PCS wireless systems). Such terrestrial networks could set up their global call delivery and routing through the non-real time satellite tier (e.g., GEO satellites) and route the real-time traffic (e.g., voice) through the real-time satellite tier (e.g., non-GEO satellites).

Figure 1:
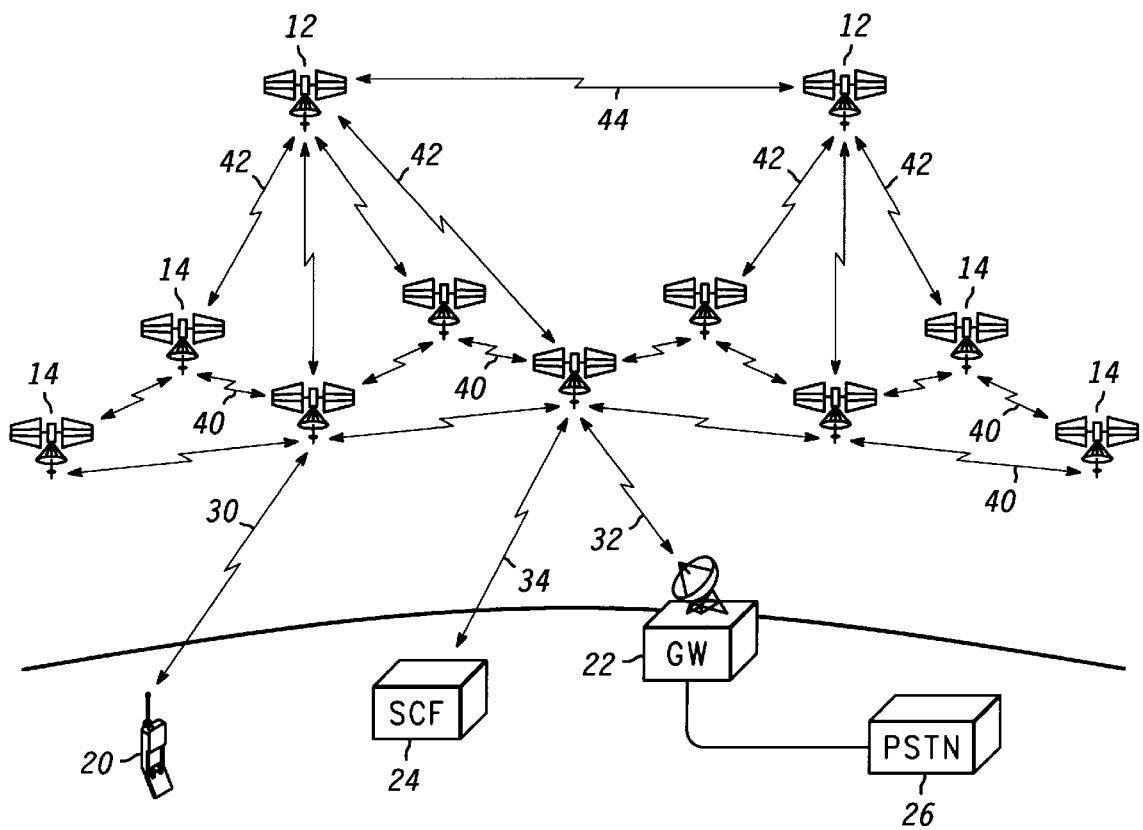
FIG. 1 illustrates a satellite communication system which includes GEO and non-GEO satellites in accordance with a preferred embodiment of the present invention.

FIG. 1 illustrates a satellite communication system which includes GEO and non-GEO satellites in accordance with a preferred embodiment of the present invention. System 10 includes one or more GEO satellites 12 and one or more non-GEO satellites 14. In a preferred embodiment, non-GEO satellites 14 are LEO satellites. LEO satellites 14 communicate with equipment 20, 22, 24 located at, below, or above the surface of the earth. For example, LEO satellites 14 communicate over link 30 with a fixed or mobile communication unit 20 which can be a portable, hand-held telephone, pager, or data device. Communication unit 20 could be located anywhere on or above the surface of the earth. In some applications, communication unit 20 also could be located underwater or underground. In addition, communication unit 20 could interface with a LEO satellite 14 through a single communication channel, or could be a communication unit that interfaces with a LEO satellite 14 using multiple communication channels.

LEO satellites 14 communicate over link 32 with gateway (GW) 22 which functions to interface system 10 with other communication systems 26 (e.g., public switched telephone networks or terrestrial cellular systems). In a preferred embodiment, gateway 22 also assists in performing functions such as call setup, billing, and other user services. LEO satellites 14 also communicate over link 34 with system control facility (SCF) 24. System control facility 24 could be incorporated into a gateway 22 or could exist as a standalone facility. System control facility 24 desirably receives telemetry information from satellites 14 and performs system control functions necessary for the operation of system 10.

In a preferred embodiment, GEO satellites 12 and LEO satellites 14 also communicate between each other over LEO crosslinks 40, LEO-GEO links 42, and GEO crosslinks 44. LEO crosslinks 40 between LEO satellites 14 are used, in a preferred embodiment, to carry delay-sensitive data such as user voice information created during a call. When a LEO satellite 14 receives such information from equipment 20 or 22, for example, LEO satellite 14 would, when appropriate, either route the delay-sensitive data back to equipment on the ground or would route the delay-sensitive data over a LEO crosslink 40. In an alternate embodiment, LEO satellites 14 could transfer data between themselves using bent-pipe links through ground equipment, rather than by using links 40.

LEO-GEO links 42 exist between LEO satellites 14 and GEO satellites 12. In a preferred embodiment, links 42 would carry non delay-sensitive data. When LEO satellites 14 receive such non delay-sensitive data, LEO satellites 14 would, when appropriate, either route the non delay-sensitive data back to equipment on the ground or would route that data over links 42 to GEO satellites 12, rather than routing the data over LEO crosslinks 40. Except for that non delay-sensitive data which is destined for ground equipment with which a LEO satellite 14 can directly communicate, the LEO satellite 14 routes some or, preferably, all non delay-sensitive data through GEO satellites 12.

Prior-art systems route all data, regardless of its type, through LEO crosslinks, thus reducing the available capacity for delay-sensitive data to be routed through LEO crosslinks. By reducing or eliminating the quantity of non delay-sensitive data sent through LEO crosslinks, the method and apparatus of the present invention allows most or all of the LEO crosslink capacity to be used for delay-sensitive data, thus effectively increasing the system capacity by a substantial amount.

In an alternate embodiment, non delay-sensitive data could be sent directly from equipment 20, 22, 24 to GEO satellites 12, rather than being routed through LEO satellites 14. In such an embodiment, equipment 20, 22, 24 would be required to have transmission power levels and equipment sufficient to communicate with GEO satellites 12. Such equipment could be more expensive than equipment necessary to communicate with LEO satellites 12, making direct communication with GEO satellites 12 less desirable.

In a preferred embodiment, links 44 exist between GEO satellites 12, although links 44 are not essential to achieve the advantages of the present invention. Links 44 are convenient where non delay-sensitive data received by a first GEO satellite 12 from a first LEO satellite 14 should be routed through a second LEO satellite 14 which does not communicate directly with the first GEO satellite 12, but does communicate directly with a second GEO satellite 12. Such data could be routed from the first LEO satellite 14, to the first GEO satellite 12, over link 44 to the second GEO satellite 12, and to the second LEO satellite 14.

In an alternate embodiment, GEO satellites 12 could transfer data between themselves using bent-pipe links through LEO satellites 14 or ground-based equipment, rather than using links 44. In another alternate embodiment, MEO satellites could be used in the system rather than, or in addition to, the LEO satellites or GEO satellites.

For illustration purposes only, FIG. 1 shows two GEO satellites 12, nine LEO satellites 14, one communication unit 20, one gateway 22, and one system control facility 24. A system incorporating the method and apparatus of the present invention could have one or any number of GEO satellites 12, LEO satellites 14, gateways 22, and system control facilities 24. In addition, such a system could support numerous communication units 20 of various types and degrees of mobility.

Figure 2:
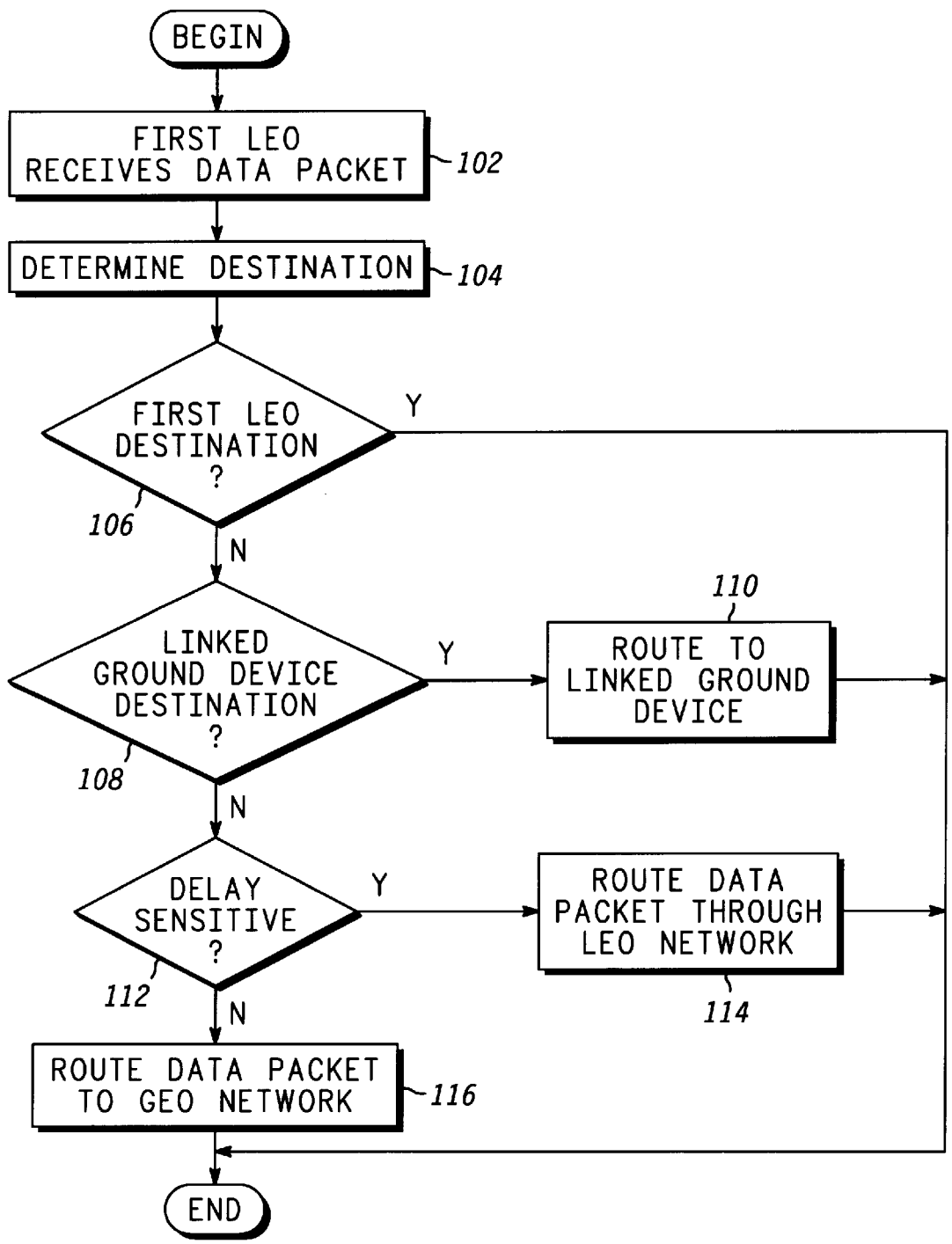
FIG. 2 illustrates a flowchart of a method for routing data through the system in accordance with a preferred embodiment of the present invention.

FIG. 2 illustrates a flowchart of a method for routing data through the system in accordance with a preferred embodiment of the present invention. The method begins, in step 102, when a first LEO satellite receives a data packet. The data packet could originate from another LEO satellite, a GEO satellite, a communication unit, a gateway, or a control facility, for example.

In step 104, the LEO satellite determines the destination of the data packet, for example, by evaluating the packet's header information. A determination is made, in step 106, whether the first LEO satellite is the destination of the data packet. If so, the first LEO satellite consumes or stores the information and the procedure ends. If not, a determination is made, in step 108, whether a ground-based device (e.g., a communication unit, gateway, or control facility) that currently is or is capable of being linked to the LEO satellite is the destination. If so, the LEO satellite sends the data packet to the linked ground device in step 110 and the procedure ends.

If a linked ground device is not the destination, then a determination is made whether the data packet includes delay-sensitive data in step 112. This determination could be made, for example, by examining a bit in the packet header which indicates whether or not the data is delay-sensitive. Alternatively, the data packet header could include a field which indicates the type of packet. For example, if the type field indicates that the packet includes voice data, the packet could be deemed to include delay-sensitive data. The source or destination of the data packet also might be used to make the determination. If the packet is destined for a control facility, for example, it could be deemed to be non delay-sensitive.

Any number of criteria could be used to determine whether or not a packet is delay-sensitive.

If the data packet does include delay-sensitive data, the data packet is routed, in step 114, through the LEO network (e.g., over a LEO crosslink) to the packet's ultimate destination. When a LEO satellite is a destination of the packet, the packet would be routed over LEO crosslinks to the destination LEO. In an alternate embodiment, the packet could be routed over bent-pipe links through ground transceivers. When ground-based equipment is the destination, the packet would be routed over LEO crosslinks to a LEO satellite which is capable of communicating with the destination equipment. That LEO satellite would then route the packet to the equipment. The procedure then ends.

If step 112 determines that the data packet does not include delay-sensitive data, the data packet is routed, in step 116, to the GEO network (e.g., over a LEO-GEO link). The GEO network then routes the data packet to its ultimate destination. If a GEO satellite is the ultimate destination, the packet would be routed over GEO crosslinks, if possible, to the destination GEO. In alternate embodiments, the packed could be routed along bent-pipe links through ground transceivers or other satellites. If a LEO satellite (or a ground device serviced by a particular LEO satellite) is the ultimate destination, the data packet is routed through the GEO network to the GEO satellite that is capable of communicating with the destination LEO satellite. That GEO satellite would then route the packet to the LEO satellite (which in turn would route the packet to the destination device, if necessary). The procedure then ends.

Although a preferred embodiment routes packetized data (e.g., voice, data, and/or control-routing information), the method and apparatus of the present invention also could be used to support circuit-switched routing as well.

Figure 3:
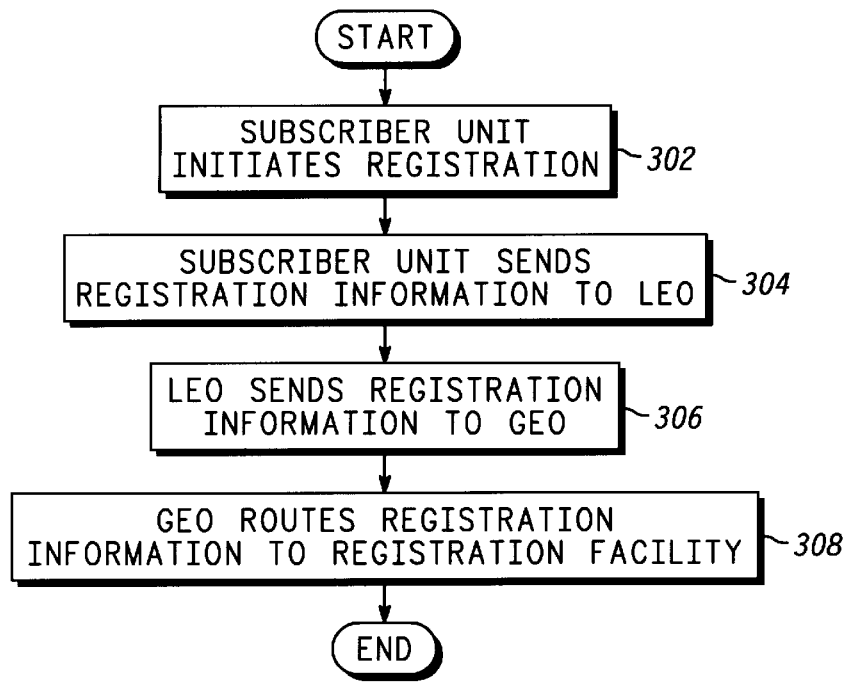
FIG. 3 illustrates a flowchart of a method for performing location registration of a communication unit in accordance with a preferred embodiment of the present invention.

FIG. 3 illustrates a flowchart of a method for performing location registration of a communication unit in accordance with a preferred embodiment of the present invention. Location registration requires messages to be passed between a communication unit and a registration facility (e.g., a gateway) via a satellite network. The registration facility stores registration information for the communication unit. For purposes of illustration, this location registration example assumes that the registration facility is not in communication contact with the same LEO satellite which that communication unit is currently communicating with. In other words, the registration facility is located some distance from the communication unit, making it necessary to route the registration information from the communication unit to the registration facility through more than one LEO satellite.

Location registration, for example, illustrates one area where non delay-sensitive data is to be routed through a system. Thus, in accordance with the present invention, the location registration data can be routed through the GEO network, rather than routing it exclusively through the LEO network. Prior-art systems would route the data through the LEO network, thus consuming valuable bandwidth resources which could be better utilized for delay-sensitive data.

The method begins, in step 302, when a communication unit initiates a location registration procedure. A location registration procedure can be initiated upon power up, at periodic intervals, or when the communication unit has moved a certain re-registration distance, for example.

In step 304, the communication unit sends registration information to a LEO satellite with which the communication unit can communicate. Registration information, for example, could include a communication unit identification number and location information obtained through a geolocation process or from a Global Positioning System (GPS) receiver. Alternatively, location information could simply describe a cell or a geographic area within which the communication unit is located.

After receiving the registration information, the LEO satellite sends the registration information to the GEO network in step 306. The LEO satellite knows to send the registration information to a GEO satellite (rather than to a LEO) based on the LEO satellite's determination that the data packet is not delay-sensitive.

In step 308, the GEO satellite network routes the registration information to the registration facility. Where the registration facility is ground based, the GEO network would route the information to the ground-based facility either directly, or through another LEO satellite which is capable of communicating with the registration facility. In an alternate embodiment, the registration facility could be satellite-based, whereupon the GEO network would route the information to an appropriate GEO or LEO satellite. The procedure then ends.

Figure 4:
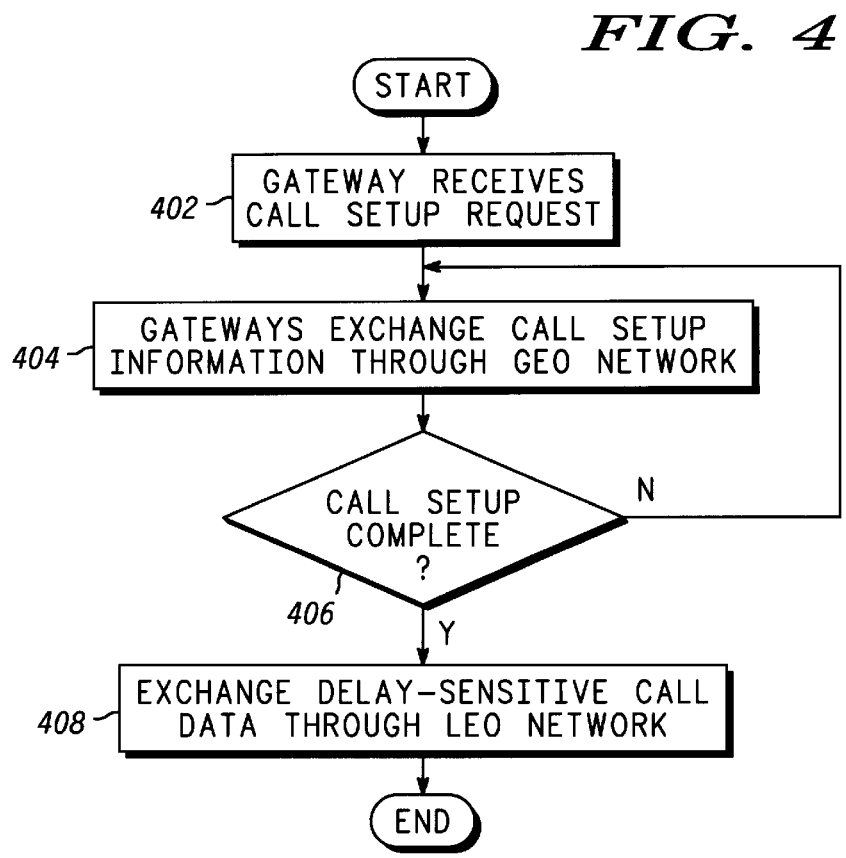
FIG. 4 illustrates a flowchart of a method for setting up a call between a source device and a destination device in accordance with a preferred embodiment of the present invention.

FIG. 4 illustrates a flowchart of a method for setting up a call between a source device and a destination device in accordance with a preferred embodiment of the present invention. The described method will illustrate the routing of both delay-sensitive and non delay-sensitive data through the system in accordance with a preferred embodiment of the present invention. The description of the method assumes that the call setup information is non delay-sensitive, but that the call ultimately will consist of the exchange of delay-sensitive data (e.g., voice data).

The method begins in step 402, when a gateway receives an incoming call request from a source communication unit. The call request can be received directly from the communication unit, or via a satellite. The gateway determines with which other gateway it must communicate in order to exchange call setup information. Assuming the other gateway is located a substantial distance from the first gateway, in step 404, the first gateway initiates the exchange of call setup data with the other gateway through the GEO network. In a preferred embodiment, the data is routed from the first gateway, through a LEO satellite, through the GEO network, through another LEO satellite, and down to the other gateway. In an alternate embodiment, one or both gateways could communicate directly with the GEO network and the LEO satellites could be bypassed.

A determination is made, in step 406, whether call setup is complete. If not, the procedure iterates as shown in FIG. 4. If so, then the exchange of delay-sensitive call data begins through the LEO satellite network in step 408. During the call, in a preferred embodiment, all delay-sensitive data will be exchanged through the LEO network, and all non delay-sensitive data will be exchanged through the GEO network.

Figure 5:
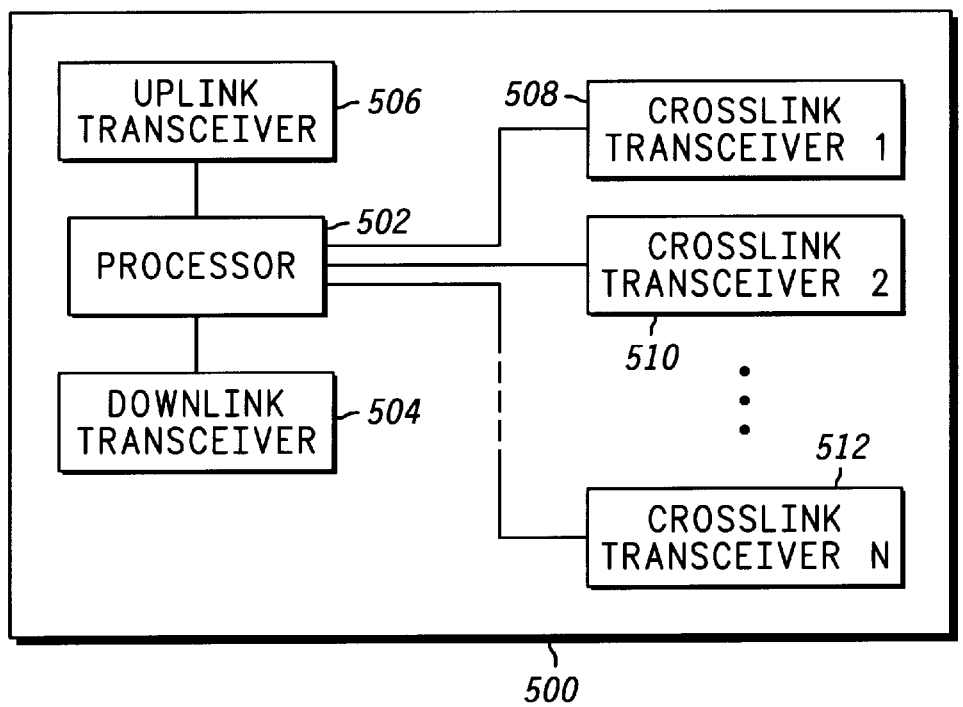
FIG. 5 illustrates a simplified block diagram of a non-GEO satellite in accordance with a preferred embodiment of the present invention.

FIG. 5 illustrates a simplified block diagram of a non-GEO satellite in accordance with a preferred embodiment of the present invention. Non-GEO satellite 500 includes processor 502, uplink transceiver 506, downlink transceiver 504, and crosslink transceivers 508–512. Uplink transceiver 506 supports a LEO-GEO link, downlink transceiver 504 supports a downlink to a ground device (e.g., a communication unit, gateway, or control facility), and crosslink transceivers 508–512 support LEO crosslinks with other LEO satellites.

Non-GEO satellite 500 can receive a data packet via any one of transceivers 504–512. After receipt of a data packet, processor 502 determines the data packet destination and determines how to route the packet. The routing decision depends on the data packet type. Unless non-GEO satellite 500 or a linked ground device is the packet destination, non delay-sensitive data packets are routed through a GEO network via uplink transceiver 506. Delay-sensitive data packets are routed through the non-GEO network via one of crosslink transceivers 508–512.

Although FIG. 5 illustrates one downlink transceiver 504, one uplink transceiver 506, and three crosslink transceivers 508–512, any number of each type of transceiver could be used, depending on the number of downlinks, uplinks, and crosslinks, respectively, which are to be provided.

Figure 6:
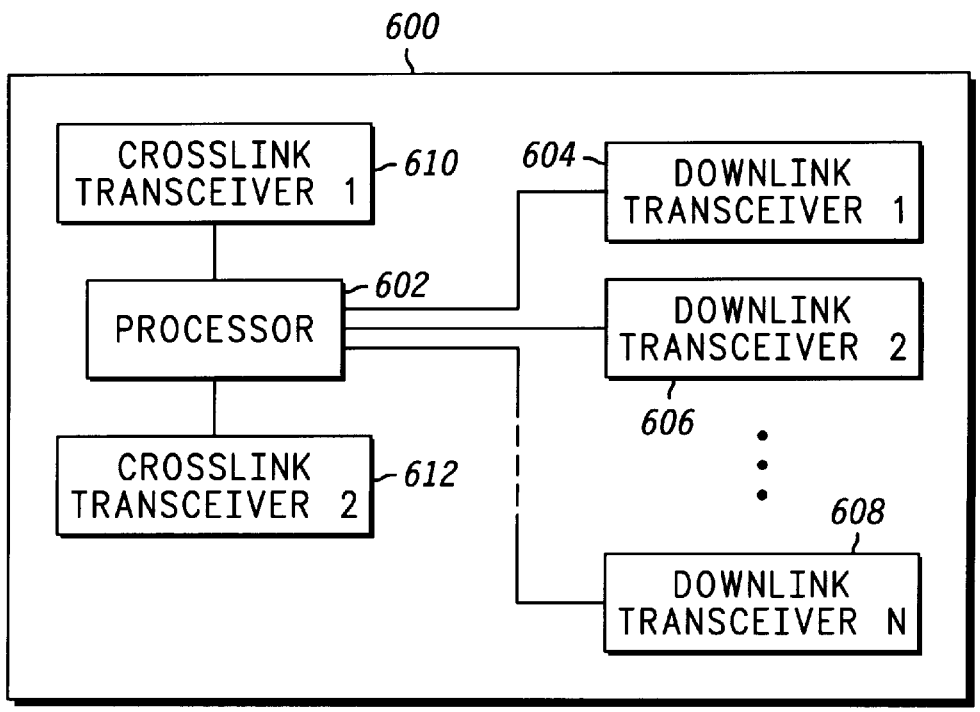
FIG. 6 illustrates a simplified block diagram of a GEO satellite in accordance with a preferred embodiment of the present invention.

FIG. 6 illustrates a simplified block diagram of a GEO satellite in accordance with a preferred embodiment of the present invention. GEO satellite 600 includes processor 602, downlink transceivers 604–608, and crosslink transceivers 610–612. Downlink transceivers 604–608 support LEO-GEO links and crosslink transceivers 610–612 support crosslinks with other GEO satellites (if any).

GEO satellite 600 can receive a data packets via any one of transceivers 604–612. After receipt of a data packet, processor 602 determines the data packet destination and determines how to route the packet. Unless GEO satellite 600 is the packet destination, the data packet is routed either through the GEO network via one of crosslink transceivers 610–612 or is routed to an appropriate LEO satellite in the LEO network via one of downlink transceivers 604–608. In an alternate embodiment, downlink transceivers 604–608 could support links directly to ground devices.

Although FIG. 6 illustrates three downlink transceivers 604–608 and two crosslink transceivers 610–612, any number of each type of transceiver could be used, depending on the number of downlinks and crosslinks, respectively, which are to be provided.

In summary, the method and apparatus of the present invention enable the call-handling capacity of a communication system to be increased by routing non delay-sensitive data through a first satellite tier of the system (e.g., one or more GEO satellites) while routing delay-sensitive data through a second satellite tier of the system (e.g., LEO satellites). While the principles of the invention have been described above in connection with specific apparatus, it is to be clearly understood that this description is made only by way of example and not as a limitation on the scope of the invention.

For example, although the description describes a system using both LEO and GEO satellites, MEO satellites or satellites in other orbits could also or alternatively be used. Any combination of satellites in different orbits could make up the multi-tier network. For example, the multi-tier network could include LEO and MEO satellite tiers, or MEO and GEO satellite tiers, or two LEO satellite tiers where some LEO satellites are predominantly for carrying delay-sensitive data, and some LEO satellites are predominantly for carrying non delay-sensitive data. In other embodiments, instead of routing non delay-sensitive data through the LEO network to the GEO network, ground equipment which has the appropriate capabilities could send and receive non delay-sensitive data directly to and from the GEO satellites. These and other changes and modifications which are obvious to those skilled in the art are intended to be included within the scope of the present invention.

What is claimed is:

1. A satellite communication system for communicating delay-sensitive data and non delay-sensitive data, the satellite communication system comprising:
   at least one geosynchronous (GEO) satellite;
   a plurality of non-geosynchronous (NGEO) satellites coupled to the at least one GEO satellite by NGEO-GEO links and coupled to each other by NGEO crosslinks; and
   a plurality of communications units coupled to the plurality of NGEO satellites and not directly coupled to the at least one GEO satellite, wherein a GEO satellite comprises means for establishing a plurality of space-based NGEO-GEO links with the NGEO satellites, and means for sending and receiving the non delay-sensitive data; and a NGEO satellite comprises means for receiving non delay sensitive data and delay-sensitive data, means for determining which data is non delay-sensitive data, means for determining which data is delay-sensitive data, means for sending the non delay-sensitive data to the at least one GEO satellite, and means for sending the delay-sensitive data to at least one NGEO satellite, the NGEO satellite routing the non delay-sensitive data to the at least one GEO satellite via a space-based NGEO-GEO link and routing the delay-sensitive data through at least one other of the NGEO satellites but not through the at least one GEO satellite.

2. The satellite communication system as claimed in claim 1, wherein the at least one GEO satellite further comprises means for sending the non delay-sensitive data to another GEO satellite.

3. The satellite communication system as claimed in claim 1, further comprising:
   at least one gateway facility comprising means for providing an interface between a terrestrially-based communication system and the NGEO satellites.

4. The satellite communication system as claimed in claim 3, wherein the at least one gateway facility further comprises means for sending delay-sensitive data to and receiving delay-sensitive data from the NGEO satellites.

5. The satellite communication system as claimed in claim 1, wherein a communication unit further comprises means for generating delay-sensitive data and sending the delay-sensitive data to the NGEO satellites.

6. The satellite communication system as claimed in claim 1, wherein the NGEO satellites comprise at least one low earth orbit (LEO) satellite.

7. The satellite communication system as claimed in claim 1, wherein the NGEO satellites comprise at least one medium earth orbit (MEO) satellite.

8. A low earth orbit (LEO) satellite of a communication system, the LEO satellite comprising:
   a crosslink transceiver comprising means for establishing a space-based LEO crosslink with at least one other LEO satellite;
   an uplink transceiver comprising means for establishing a space-based LEO-GEO link with a geosynchronous (GEO) satellite;
   a downlink transceiver comprising means for establishing a link with a ground device, the transceivers for receiving and transmitting data packets; and
   a processor, coupled to the transceivers, comprising means for evaluating routing information contained within the data packets, wherein when the routing information indicates that a data packet is a non delay-sensitive data packet, the processor routes the data packet to a GEO satellite of the communication system using the space-based LEO-GEO link, at least one LEO-GEO link being used for routing non delay-sensitive data packets between LEO satellites, and wherein when the routing information indicates that the data packet is a delay-sensitive data packet, the processor routes the data packet to another LEO satellite of the communication system using the crosslink transceiver, at least one LEO crosslink being used for routing delay-sensitive data packets between the LEO satellites.

9. The LEO satellite as claimed in claim 8, wherein the processor routes at least one non delay-sensitive data packet to a around device when the LEO satellite can directly communicate with the ground device.

10. A geosynchronous (GEO) satellite of a communication system, the GEO satellite comprising:
    a crosslink transceiver comprising means for establishing a space-based GEO crosslink with at least one other GEO satellite;
    a downlink transceiver comprising means for establishing a space-based LEO-GEO link with a low earth orbit (LEO) satellite, the transceivers for receiving and transmitting data packets, wherein the GEO satellite is dedicated to routing non delay-sensitive data packets; and
    a processor, coupled to the transceivers, comprising means for identifying a destination of a non delay-sensitive data packet, and processing the non delay-sensitive data packet according to the destination, wherein the processor routes the non delay-sensitive data packet to another GEO satellite using the GEO crosslink or to a LEO satellite using the LEO-GEO link.

11. The GEO satellite as claimed in claim 10, wherein the GEO satellite further comprises a second downlink transceiver coupled to the processor for establishing a link directly to a ground device.

12. A method for registering a communication unit of a satellite communication system, the satellite communication system including at least one geosynchronous (GEO) satellite tier and at least one non-geosynchronous (NGEO) satellite tier, the method comprising the steps of:

receiving registration information by a NGEO satellite when the communication unit initiates a registration procedure;

identifying, by the NGEO satellite, the registration information as non delay-sensitive data;

sending, by the NGEO satellite, the registration information to a GEO satellite via a space-based NGEO-GEO link which is dedicated to routing non delay-sensitive data;

receiving, by the GEO satellite, the registration information from the NGEO satellite via the space-based NGEO-GEO link between the NGEO satellite and the GEO satellite; and routing, by the GEO satellite, the registration information to a ground based facility through a LEO satellite, thereby enabling the communication unit to be registered with the satellite communication system.

13. The method as claimed in claim 12, wherein the step of routing comprises the step of:

routing the registration information to a satellite-based registration facility in which a registration database is located.

* * * * *